(12) United States Patent
Milan

(10) Patent No.: US 6,905,374 B2
(45) Date of Patent: *Jun. 14, 2005

(54) BASE UNIT FOR MODULAR COMPONENT SYSTEM

(76) Inventor: Henry Milan, 1709 Apple Ridge Ct., Rochester Hills, MI (US) 48306

( * ) Notice: Subject to any disclaimer, the term of this patent is extended or adjusted under 35 U.S.C. 154(b) by 109 days.

This patent is subject to a terminal disclaimer.

(21) Appl. No.: 10/353,887

(22) Filed: Jan. 29, 2003

(65) Prior Publication Data

US 2003/0220001 A1 Nov. 27, 2003

Related U.S. Application Data

(63) Continuation of application No. 09/730,030, filed on Dec. 5, 2000, now Pat. No. 6,607,408.
(60) Provisional application No. 60/169,055, filed on Dec. 6, 1999.

(51) Int. Cl.[7] .................................................. H05K 5/02
(52) U.S. Cl. ..................................................... 439/752.5
(58) Field of Search ........................... 439/284, 286–92, 439/295, 529–30, 540.1, 541.5, 928, 928.1

(56) References Cited

U.S. PATENT DOCUMENTS

| | | | |
|---|---|---|---|
| 4,950,178 A | * 8/1990 | Harvey et al. | 439/507 |
| 5,645,434 A | 7/1997 | Leung | 439/74 |
| 5,838,548 A | * 11/1998 | Matz et al. | 439/928 |
| 6,137,686 A | * 10/2000 | Saye | 361/732 |
| 6,141,221 A | 10/2000 | Tong et al. | 361/724 |
| 6,462,953 B2 | 10/2002 | Tong et al. | 361/732 |
| 6,726,509 B2 | * 4/2004 | Milan | 439/752.5 |

* cited by examiner

Primary Examiner—Renee Luebke
(74) Attorney, Agent, or Firm—Butzel Long

(57) ABSTRACT

A modular stackable USB hub system includes a base unit having a downstream power port for mounting to downstream components in the modular stackable component system. The downstream power port includes a downstream power port connector, a voltage conductor and a ground conductor. The voltage and ground conductors pass voltage and ground to the downstream component connected to the downstream power port.

5 Claims, 15 Drawing Sheets

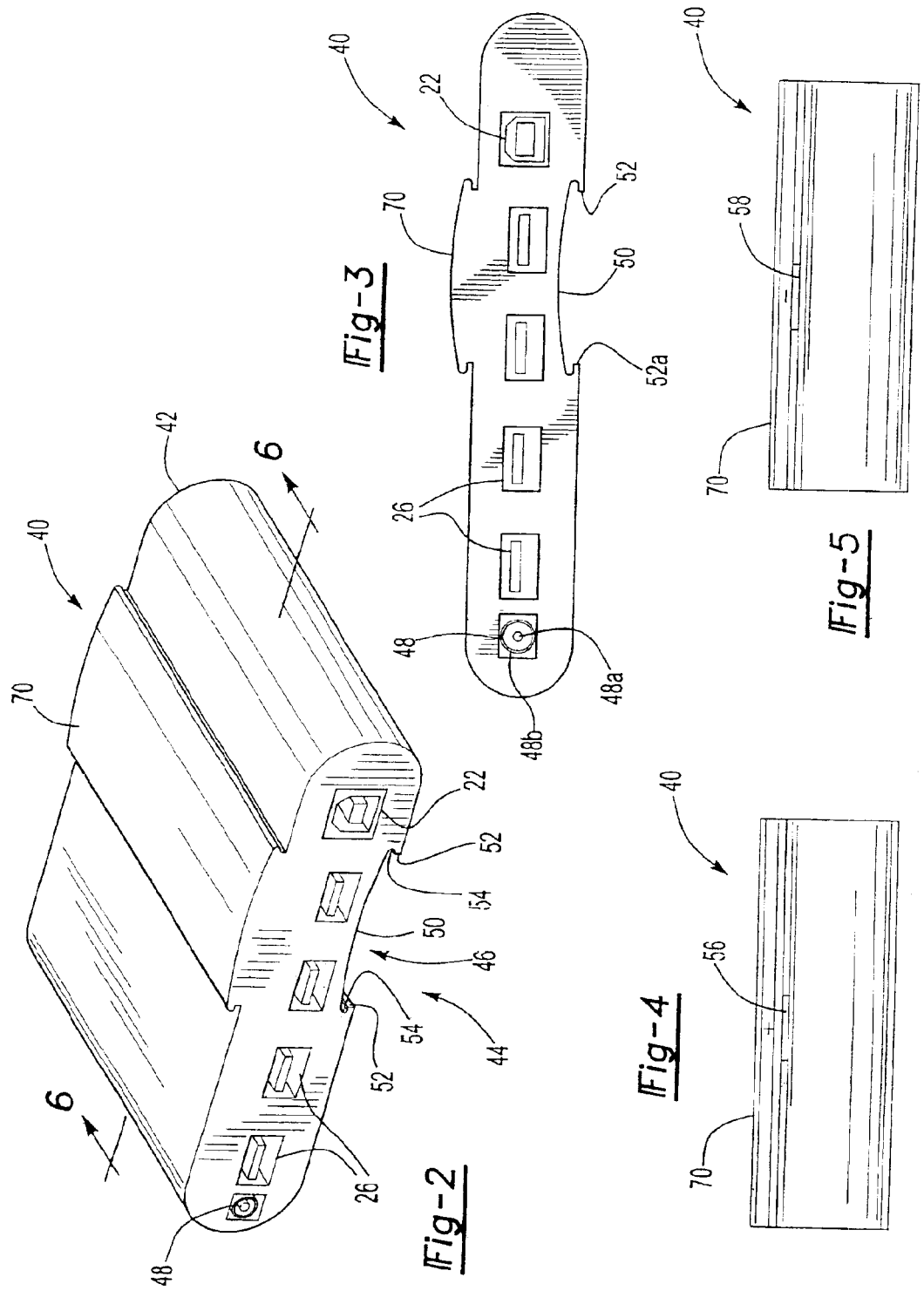

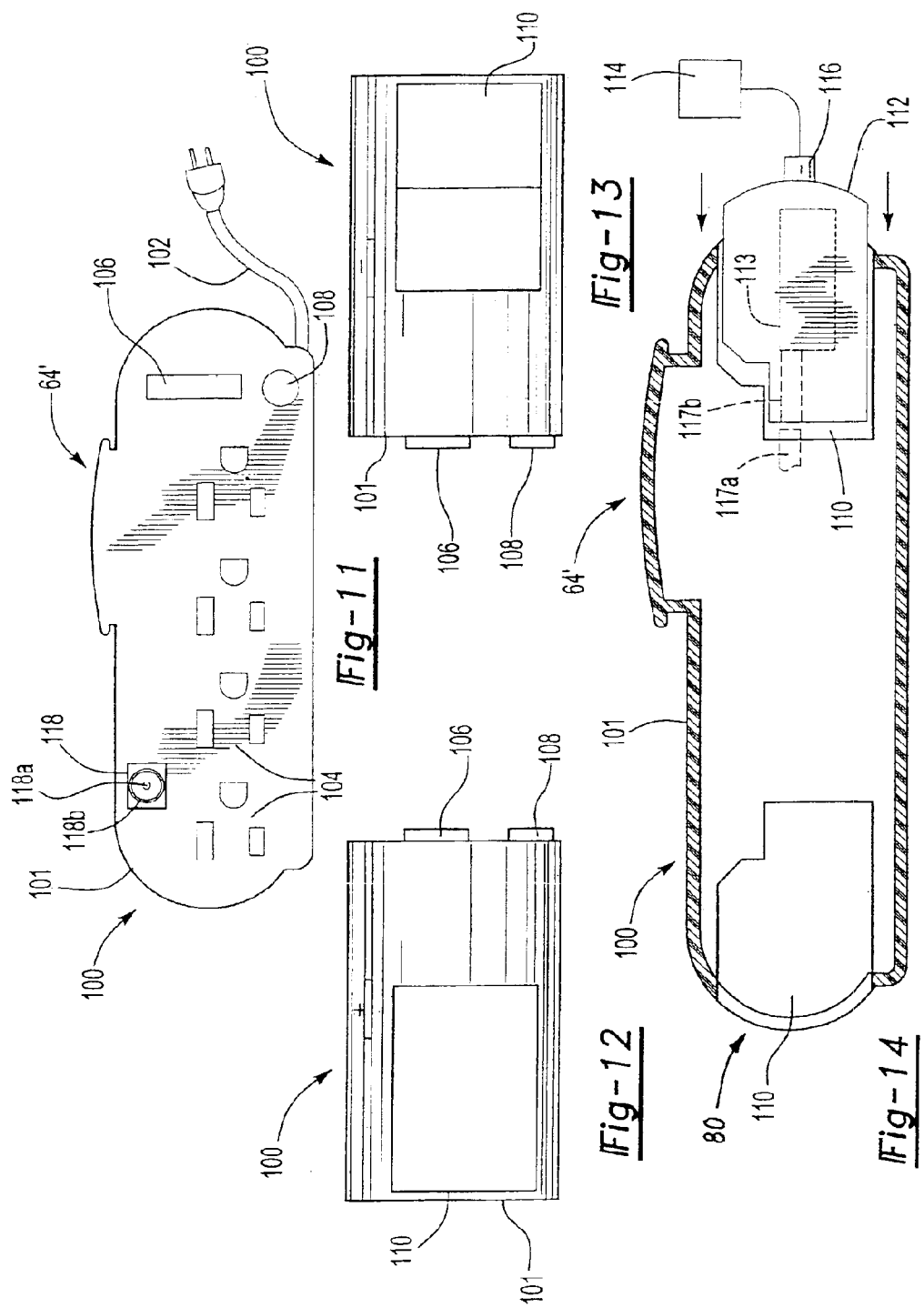

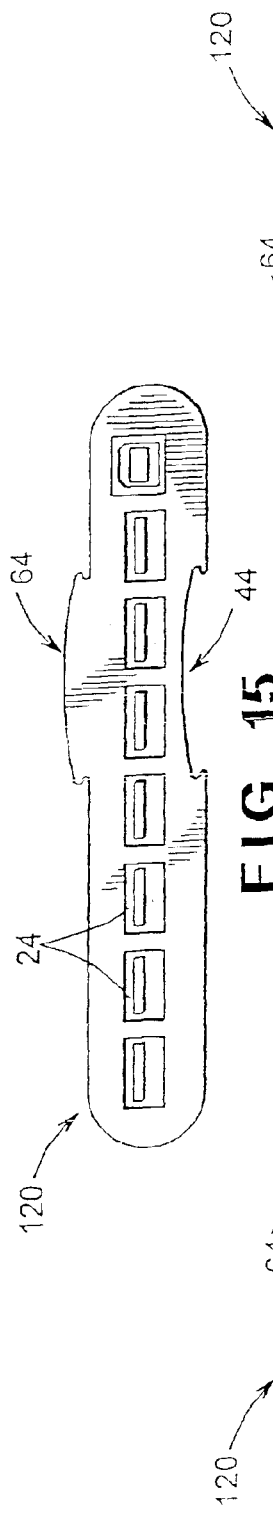
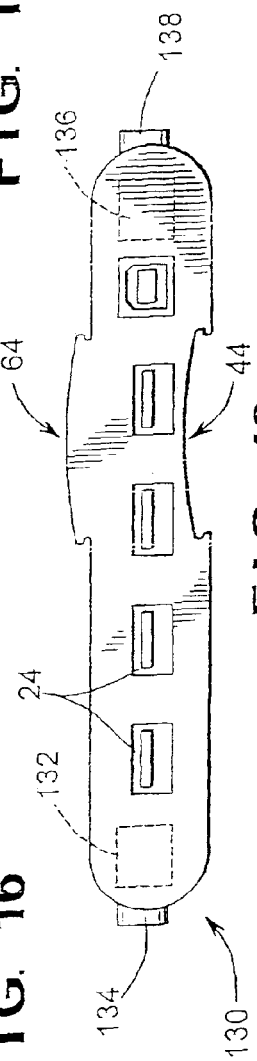
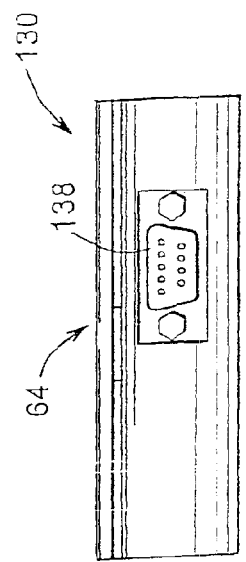

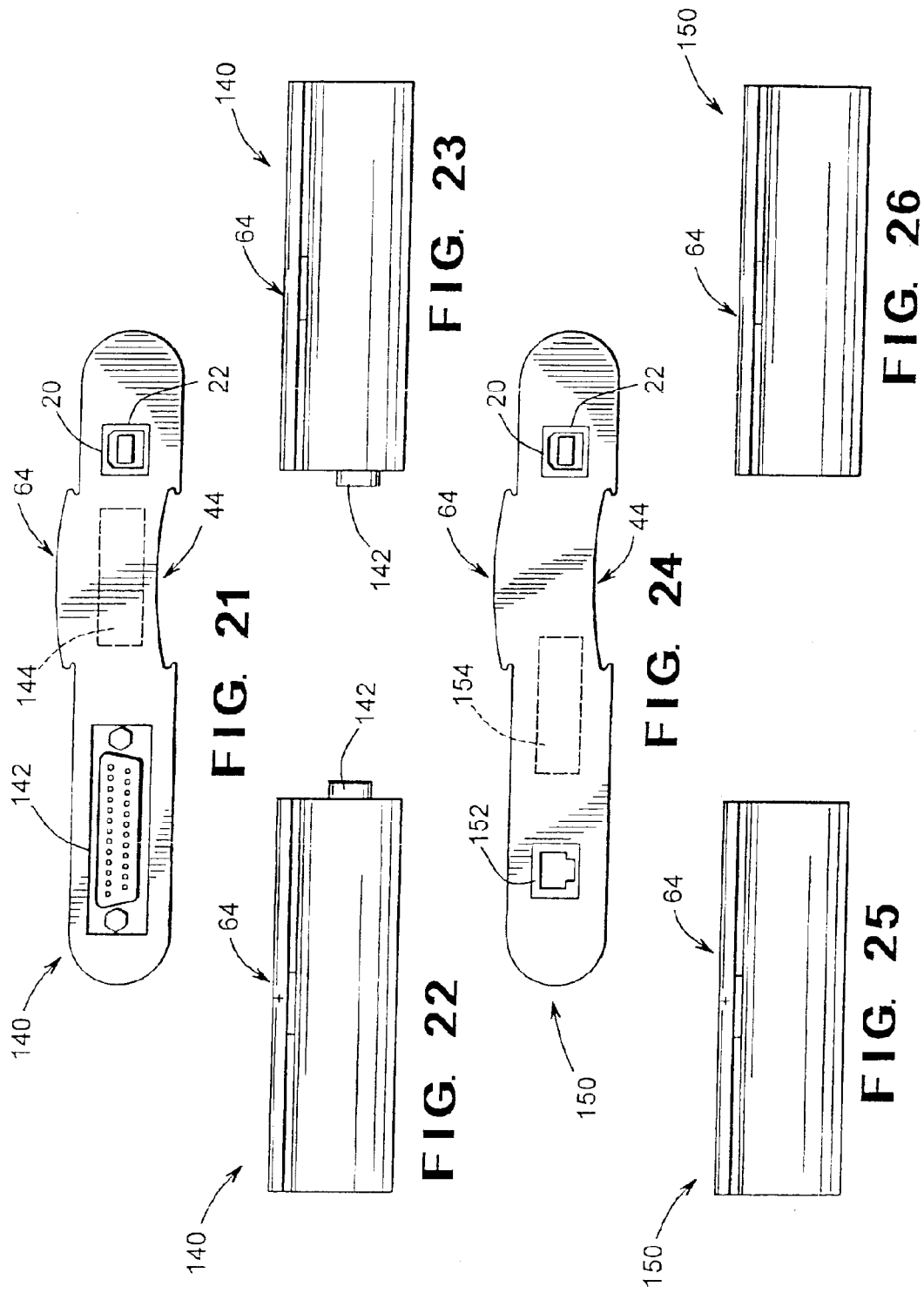

BASE UNIT FOR MODULAR COMPONENT SYSTEM

RELATED APPLICATION

The present application is a continuation of application Ser. No. 09/730,030, filed Dec. 5, 2000 now U.S. Pat. No. 6,607,408, for Modular Stackable Component System Including Universal Serial Bus Hub, the priority of which is claimed hereby. This application also claims the benefit of U.S. Provisional Application No. 60/169,055, filed Dec. 6, 1999. The provisional application Ser. No. 60/169,055, and the divisional application Ser. No. 09/730,030, are hereby incorporated by reference in their entireties.

BACKGROUND OF THE INVENTION

The present invention relates to a Universal Serial Bus (hereinafter USB) hub, and more particularly to a modular stackable component system including a base unit and one or more stackable USB hubs mounted to the base unit.

A personal computer system typically includes a computer, a display such as a CRT or flat panel display, and other peripheral devices communicating with the computer for entering data, printing data or controlling the computer. The peripheral devices require a connection to the computer which will enable them to communicate with the computer. Typically, most peripheral devices communicate with the computer over an individual connection cable having a corresponding connector attached to the computer.

A USB hub provides a convenient central data connection point for attaching multiple peripheral devices to a computer. The hub relays data from the computer to all enabled devices connected to the data hub, and relays data from the enabled devices to the computer. This data relay is performed without any data storage or significant delay. The USB hub is connected to the computer via a single USB upstream connector. The USB hub also includes a plurality of downstream ports for connecting the peripheral devices to the hub. The USB hub uses a standardized connectors at the upstream and downstream ports to provide universal connectivity between peripheral devices and the computer thus simplifying these connections by eliminating different cords and connectors.

Conventional USB hubs receive power for low power applications via a positive voltage conductor and a ground conductor from a source, such as the computer, through the upstream port. Conventional USB hubs are also equipped with a connector for connecting with a transformer plugged into a typical AC outlet for providing DC power to the hub for high power applications. When more than one USB hub is used, each hub is connected to a separate transformer for high power applications resulting in a clutter of cords, transformers, and used outlets. It is desirable to simplify the connection of multiple USB hubs thereby reducing the number of cords and transformers needed as well as providing a more space efficient footprint.

SUMMARY OF THE INVENTION

A stackable USB hub having an upstream power port for mounting to other upstream components in a stackable component system. The upstream power port includes an upstream power port connector, a voltage conductor and ground conductor for receiving voltage and ground from the upstream component to supply the high current requirements of the USB hub in high power applications, thereby eliminating the need for a separate transformer for the USB hub in high power applications.

The stackable USB hub further includes a downstream power port for mounting to other components in the modular stackable component system. The downstream power port includes a downstream power port connector, a voltage conductor and a ground conductor. The voltage and ground conductors are connected to the respective voltage and ground conductors of the USB upstream power port connector for passing voltage and ground to the downstream component connected to the downstream power port, thereby eliminating the need for a separate transformer for each component of the system. The stackable configuration also reduces the footprint of the system. It should be understood that the voltage and ground conductors, while a part of the power port, do not physically need to be part of the power port connector.

The modular stackable USB hub system includes other components such as a base unit having a suitable power port for releasably mounting to the stackable USB hub.

BRIEF DESCRIPTION OF THE DRAWINGS

The advantages of the invention will become readily apparent to those skilled in the art from the following detailed description of a preferred embodiment when considered in the light of the accompanying drawings, in which:

FIG. 2 is a perspective view of an improved USB hub embodying the present invention;

FIG. 3 is a front elevational view of the improved USB hub shown in FIG. 2;

FIG. 4 is a left side elevational view of the improved USB hub shown in FIG. 2;

FIG. 5 is a right side elevational view of the improved USB hub shown in FIG. 2;

FIG. 11 is a front elevational view of a base unit in accordance with the present invention;

FIG. 12 is a left side elevational view of the base unit shown in FIG. 11;

FIG. 13 is a right side elevational view of the base unit shown in FIG. 11;

FIG. 14 is a sectional elevational view of the base unit shown in FIG. 11;

FIG. 15 is a front elevational view of an alternate embodiment of the stackable USB hub in accordance with the invention;

FIG. 16 is a left side elevational view of the improved USB hub shown in FIG. 15;

FIG. 17 is a right side elevational view of the improved USB hub shown in FIG. 15;

FIG. 18 is a front elevational view of a second alternate embodiment of the stackable USB hub in accordance with the invention;

FIG. 19 is a left side elevational view of the improved USB hub shown in FIG. 18;

FIG. 20 is a right side elevational view of the improved USB hub shown in FIG. 18;

FIG. 21 is a front elevational view of a stackable USB to SCSI converter in accordance with the invention;

FIG. 22 is a left side elevational view of the stackable USB to SCSI converter shown in FIG. 21;

FIG. 23 is a right side elevational view of the stackable USB to SCSI converter shown in FIG. 21;

FIG. 24 is a front elevational view of a stackable USB to LAN converter in accordance with the invention;

FIG. 25 is a left side elevational view of the stackable USB to LAN converter shown in FIG. 24;

FIG. 26 is a right side elevational view of the stackable USB to LAN converter shown in FIG. 24;

It is to be understood that the present invention is not limited to the details of construction and arrangement of parts illustrated in the accompanying drawings, since the invention is capable of other embodiments, and is capable of being practiced or carried out in various ways within the scope of the claims. Also, it is to be understood, that the phraseology and terminology employed herein is for the purpose of description, and not of limitation.

DETAILED DESCRIPTION OF THE PREFERRED EMBODIMENTS

The specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
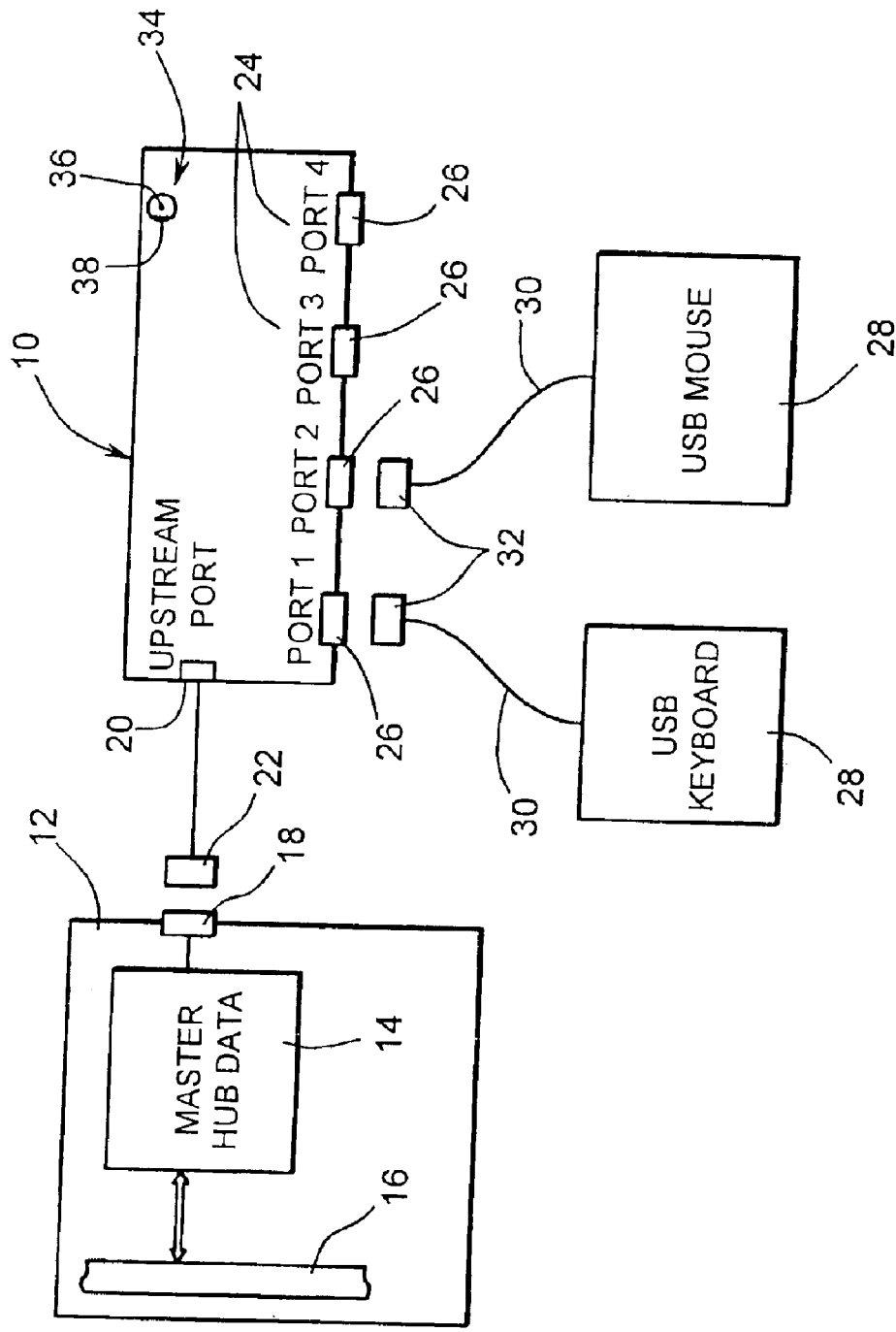
FIG. 1 is a block diagram illustrating a conventional universal serial bus hub.
Figure 6:
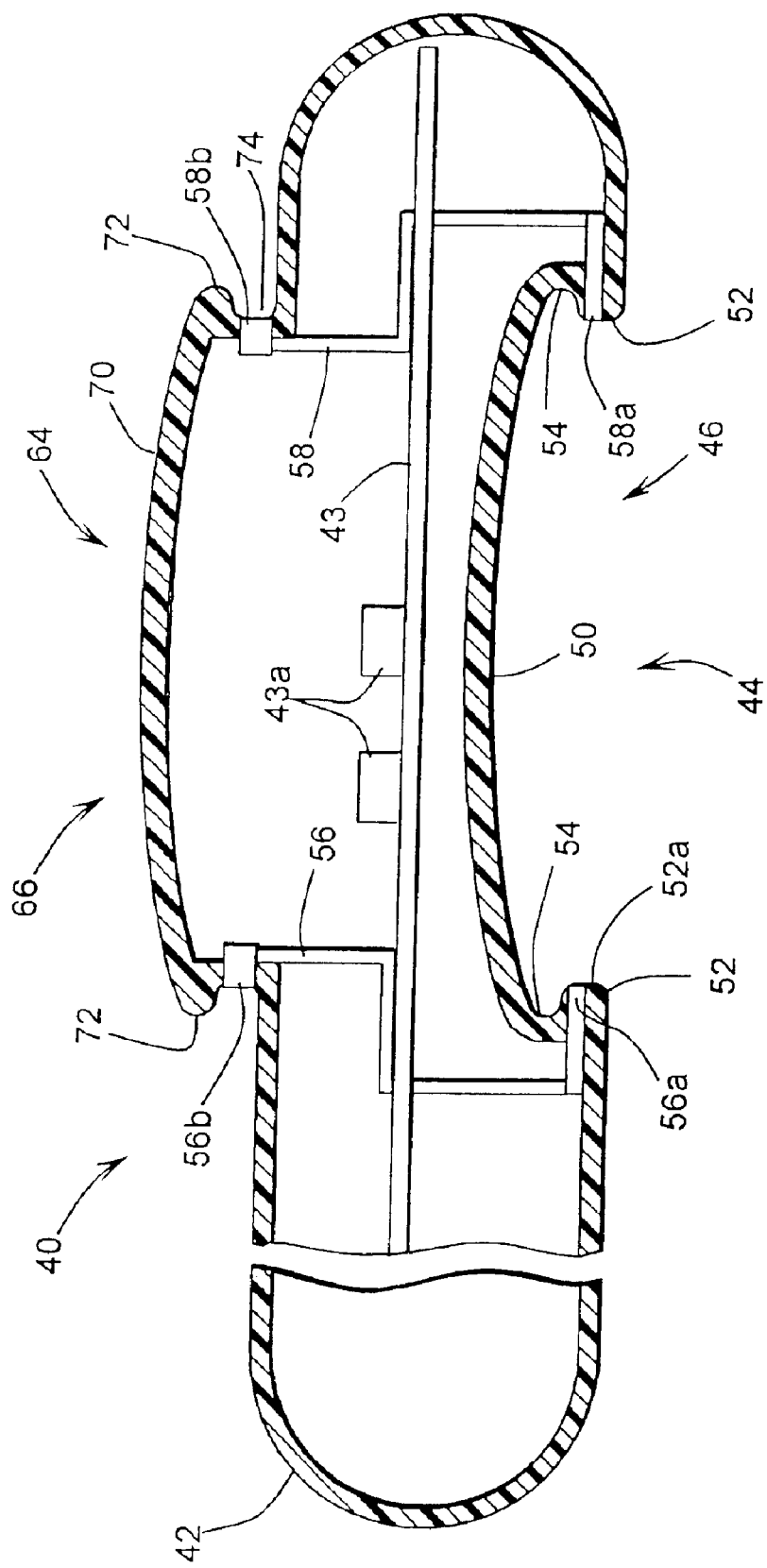
FIG. 6 is a sectional view, taken in the direction of the arrows, along the section line 6—6 of FIG. 2.

Referring to FIG. 1, a block diagram is shown illustrating the connection of a known USB hub 10 to a computer 12. The computer 12 has a USB interface which includes a master data hub 14 for receiving data from the USB hub 10. The master data hub 14 is coupled to the computer 12 via an internal bus 16 which provides a communication path between the master data hub and the computer. The master data hub 14 includes at least one USB connector 18. The USB hub 10 includes an upstream port 20 having a corresponding USB plug 22 which connects to the USB connector 18 of the master data hub 14.

The USB hub 10 also includes a plurality of downstream ports 24 having downstream USB connectors 26 to permit multiple peripheral devices 28, such as a keyboard, mouse, etc., to be coupled to the master data hub 14 through the USB hub 10. The peripheral devices 28 are each connected by a connection cable 30 to a USB connector 32 which mates with the downstream port connectors 26 of the USB hub 10.

The USB hub 10 typically contains connections for receiving power in two ways. First, the USB hub is bus powered for applications in which total current provided to the hub is less than approximately 500 mA. In bus powered applications, the USB hub receives power through the upstream port 20 from the USB plug 22 which contains separate positive and ground conductors. The USB hub can transfer a limited amount of current, approximately 100 mA, to each of four devices through the downstream ports 24 via positive and ground conductors in the downstream connectors 26.

The USB hub 10 also includes a separate power connector 34 for receiving sufficient power to supply the higher current demands to the downstream ports 24 in high power applications. The power connector 34 includes a positive voltage conductor 36 and a ground conductor 38 for receiving DC voltage, preferably 5 volts, from a typical transformer (not shown) connected to an AC powered outlet (also not shown).

Referring now to FIGS. 2–6, a stackable modular four port USB hub is shown generally at 40. The components of the USB hub 40, which are similar to the conventional USB hub shown in FIG. 1, are indicated with the same numerals. The stackable USB hub includes a USB type B female connector 22 connected to an upstream port 20 (refer to port 20 shown in FIG. 1) and four USB type A female connectors 26 connected to corresponding downstream ports 24 (refer to ports 24 shown in FIG. 1). The stackable USB hub further includes a housing 42 for mounting the USB A and B connectors 22, 26 and a circuit board 43 containing conventional USB hub circuitry 43a.

The USB hub housing 42 includes an upstream power port 44 for mounting the stackable USB hub 40 to a stackable upstream component (described in detail below) and for receiving power and ground from the upstream component for high power hub applications. Furthermore, the USB hub housing 42 includes a downstream power port 64 for mounting a stackable downstream component (described in detail below) to the USB hub and for passing the power and ground received from the upstream power port 44 to the downstream component thereby supplying its high power demands.

The upstream power port 44 includes an upstream power port connector 46 (hereinafter called the first connector) for mating with a complementary shaped downstream connector on the downstream power port of the downstream component as shall be described in detail below. The upstream and/or downstream connector may be of a quick connect type, if desired.

The first connector 46 is preferably a female connector, including a recess 50, and a pair of flanges 52. Each flange 52 extends out over the recess 50 terminating in an inner edge 52a. A groove 54 is defined between the flange 52 and the recess 50. The flanges 52 extend from opposite sides of the recess 50 defining a pair of oppositely disposed grooves 54. The grooves 54 preferably extend along the entire sides of the recess, although alternatively, they may not. The recess 50, flanges 52, and grooves 54 preferably extend across the entire housing 42, although alternatively, they may only extend across a portion of the housing.

A positive voltage conductor 56 is disposed in one of the flanges 52 such that it terminates in a first end 56a which is flush with, or which extends slightly from, the inner edge of the flange 52a. A ground conductor 58, including a first end 58a, is disposed in the opposite flange 52 in a similar manner. The voltage and ground conductor first ends 56a, 58a are located a predetermined distance from the end of the grooves 54, and preferably across from each other although, alternatively, they may be located at different distances from the ends of the grooves. The voltage and ground conductors 56, 58 are electrically connected to the circuit board 43 and with the USB circuitry 43a in a conventional manner so as to provide power to the USB hub for high power applications described above.

The USB hub downstream power port 64 includes a downstream power port connector 66 (hereinafter called the second connector) for mating with the complementary shaped first connector 46 of another stackable USB hub device as shall be described in detail below. The second connector 66 is preferably a male connector having a boss 70 protruding from the housing. The boss 70 has a shape which is complementary to the recess 50 thereby allowing the boss to be received within the recess. The second connector 66 further includes a pair of flanges 72, each flange extending from the opposite side of the boss. A groove 74 is defined between each flange 72 and the housing 42 at the base of the boss 70. The grooves 74 preferably extend along the entire sides of the boss 70, although alternatively, they may not. The boss 70, flanges 72, and grooves 74 preferably extend across the entire housing 42, although alternatively, they may only extend across a portion of the housing.

The positive conductor 56 described above also extends to second connector 66 of the downstream power port 64, terminating in a second end 56b which is disposed in one of the second connector grooves 74 such that the second end is flush with, or extends slightly from, the groove.

The ground conductor 58 described above includes a second end 58b which is disposed in the opposite groove 74 in a similar manner. The positive conductor second end 56b is disposed a predetermined distance from the end of the groove 74, thereby corresponding to the same location as the positive conductor first end 56a in the first connector. Similarly, the ground conductor second end 58b is disposed at a location which corresponds to the location of the ground conductor first end 58a in the first connector.

The first and second connectors may alternatively be switched such that the first connector is a male connector embodying the features of the second connector, and the second connector is a female connector embodying the features of the first connector. Alternatively, neither connector may be considered as male or female, but rather each may have complimentary shaped features for connecting to the other. The first and second connectors 46, 66 described above are only examples of connectors which are suitable for the upstream and downstream power ports. Any known connector or coupler may be used to connect, mount, couple, join or link the upstream power port 44 of the hub 40 to another stackable component having a downstream power port 64 and the downstream power port of the hub 40 to another stackable component having an upstream power port. Examples of such connectors include a housing portion and shroud, mating surfaces and fasteners, screw type, tongue and groove, and cam and groove connectors.

Additionally, the connectors may include retainers for keeping the connectors connected, such as a recess and a protrusion, a "snap" type retainer, a "snap-lock" type, an "internal snap" type, a "locking" type or a "finger pressure removal" type, or any known fasteners, including screws, bolts and the like.

An optional conventional power connector 48 may also be disposed on the housing 42. The power connector 48 includes a positive voltage conductor 48a and a ground conductor 48b for providing DC voltage, preferably 5 volts, and ground to the hub 40 from a conventional source such as a transformer (not shown) connected to a conventional AC power outlet, or from the computer (not shown) as shall be described in further detail below. The voltage and ground conductors 48a, 48b are electrically connected to the circuit board 43 and the USB circuitry 43a in a conventional manner so as to provide power to the USB hub 40 for high power applications. Additionally, the voltage and ground conductors 48a, 48b are electrically connected to the positive voltage conductor 56 and the ground conductor 58. The power connector 48 may be any conventional power connector known in the art.

Figure 7:
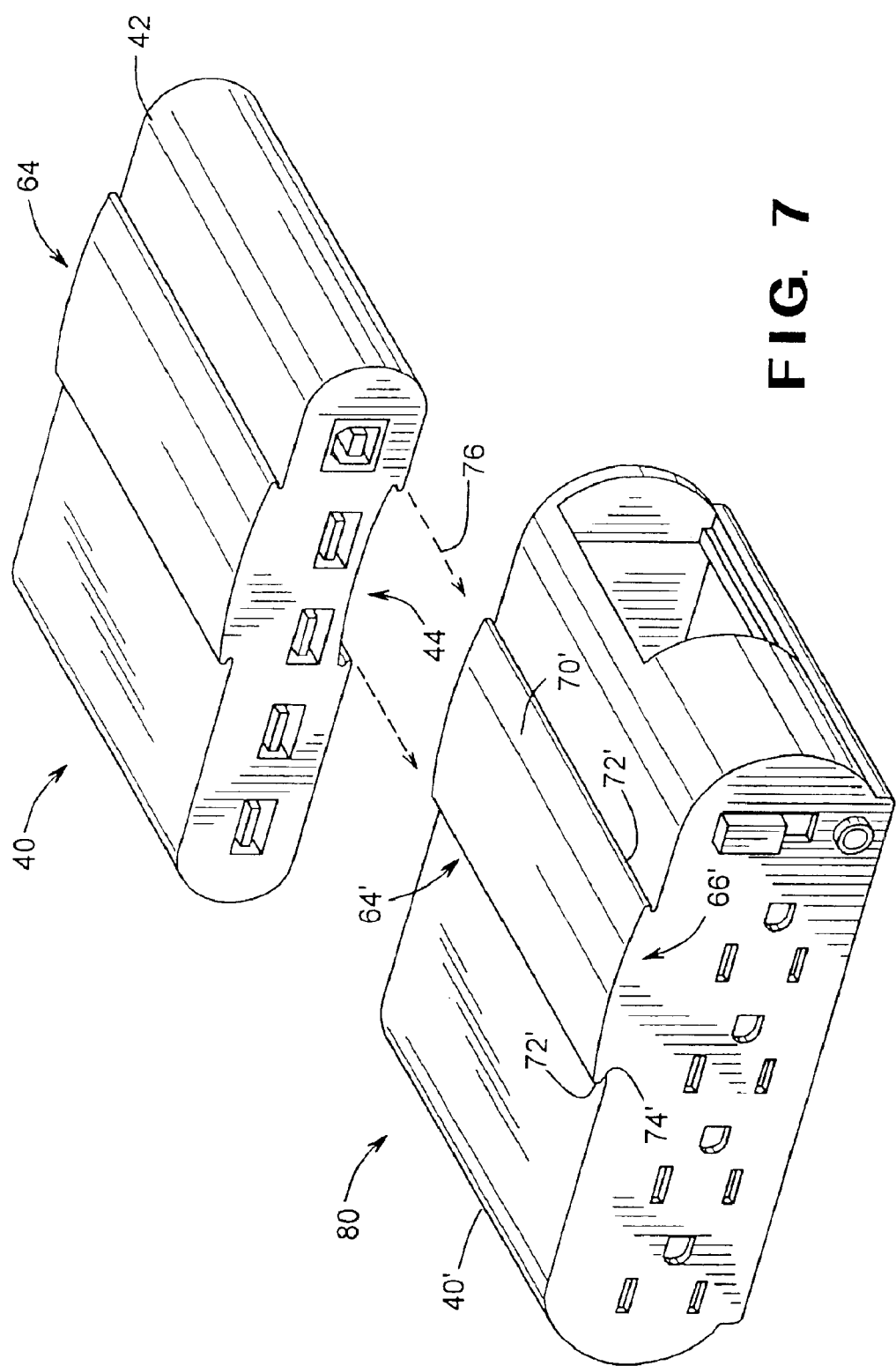
FIG. 7 is a perspective view of the improved USB hub shown in FIG. 2 connecting with a downstream component in accordance with the present invention.
Figure 8:
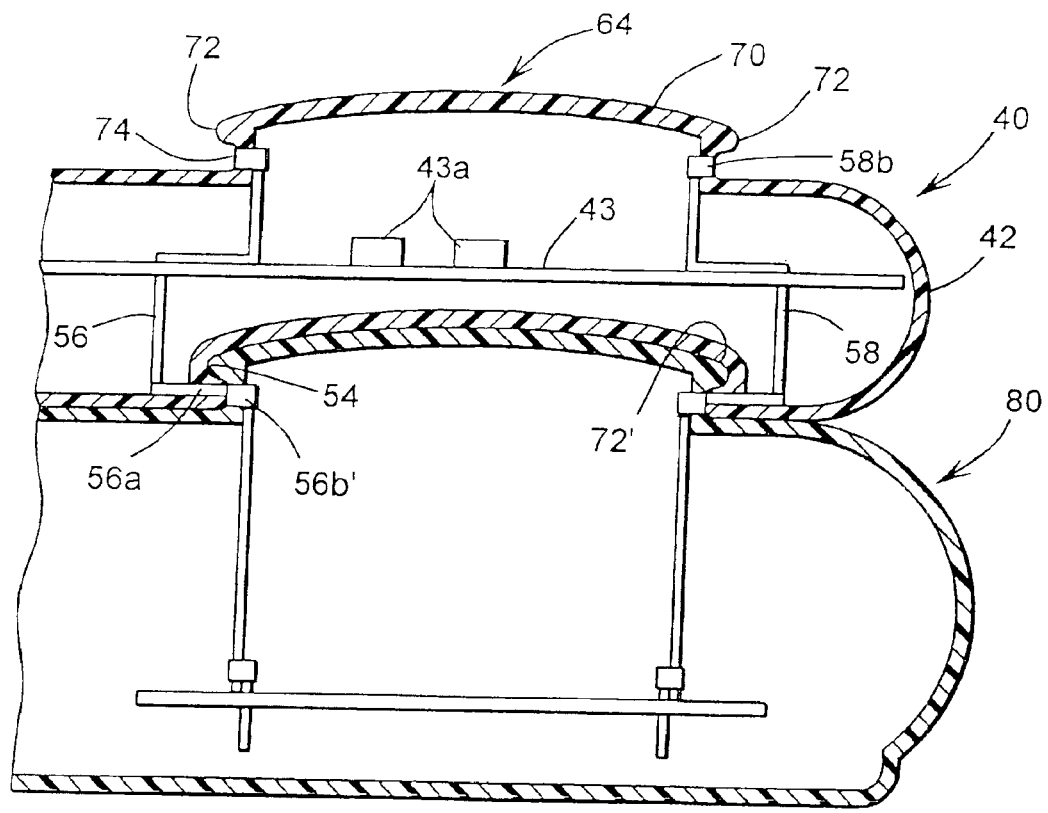
FIG. 8 is a partial sectional elevational view of the improved USB hub shown in FIG. 7, when fully connected.
Figure 9:
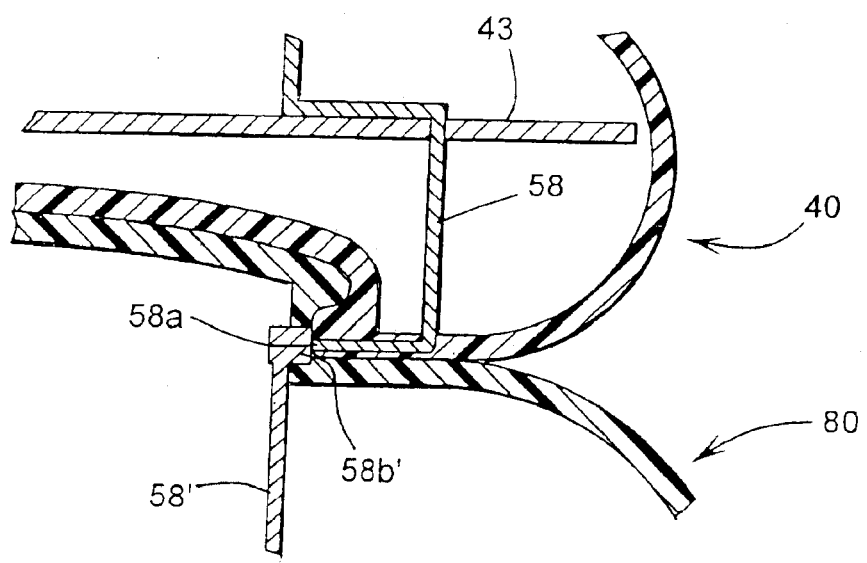
FIG. 9 is an enlarged view of a portion of the improved USB hub shown in FIG. 8.

Referring now to FIGS. 7–9, the stackable USB hub 40 can be mounted to an upstream component 80 in the modular stackable USB hub and surge suppressor system via the upstream power port 44. The upstream component 80 may be any stackable component having the downstream power port 64 described above. Examples of the upstream component 80 include but are not limited to a base unit (described below), another USB hub, a stackable USB to LAN converter (described below), or a stackable USB to SCSI converter (described below).

The upstream component 80 includes a housing 40' having a downstream power port 64' which is similar to the downstream power port 64 of the USB hub, including a second connector 66' having a boss 70', flanges 72' and grooves 74'. The upstream power port 44 provides a physical connection between the USB hub 40 and the upstream component 80 via the first connector 46 thereby securing the USB hub housing 42 to the upstream component housing 40'. Additionally, the upstream power port 44 provides an electrical connection between the USB hub 40 and the upstream component 80 passing a positive voltage and ground from the upstream component to the USB hub 40 for supplying its power requirements in high power applications.

The USB hub 40 may be connected to the upstream component 80 by sliding the downstream power port connector 66' of the upstream component into the first connector 46 of the USB hub (as shown by arrows 76 in FIG. 7) so that the boss 70' of the second connector 66' is received in the recess 50 of the first connector 46 on the USB hub. The first connector flanges 52 slide into the second connector grooves 74', and the second connector flanges 72' slide into the first connector grooves 54. The two components 40, 80 are connected correctly when the first ends 56a and 58a of the first connector voltage and ground conductors 56, 58 make electrical contact with the corresponding voltage and ground conductors 56' 58' in the second connector. This electrical connection provides the high current power connection between the stackable USB hub 40 and the other component 80.

Figure 10:
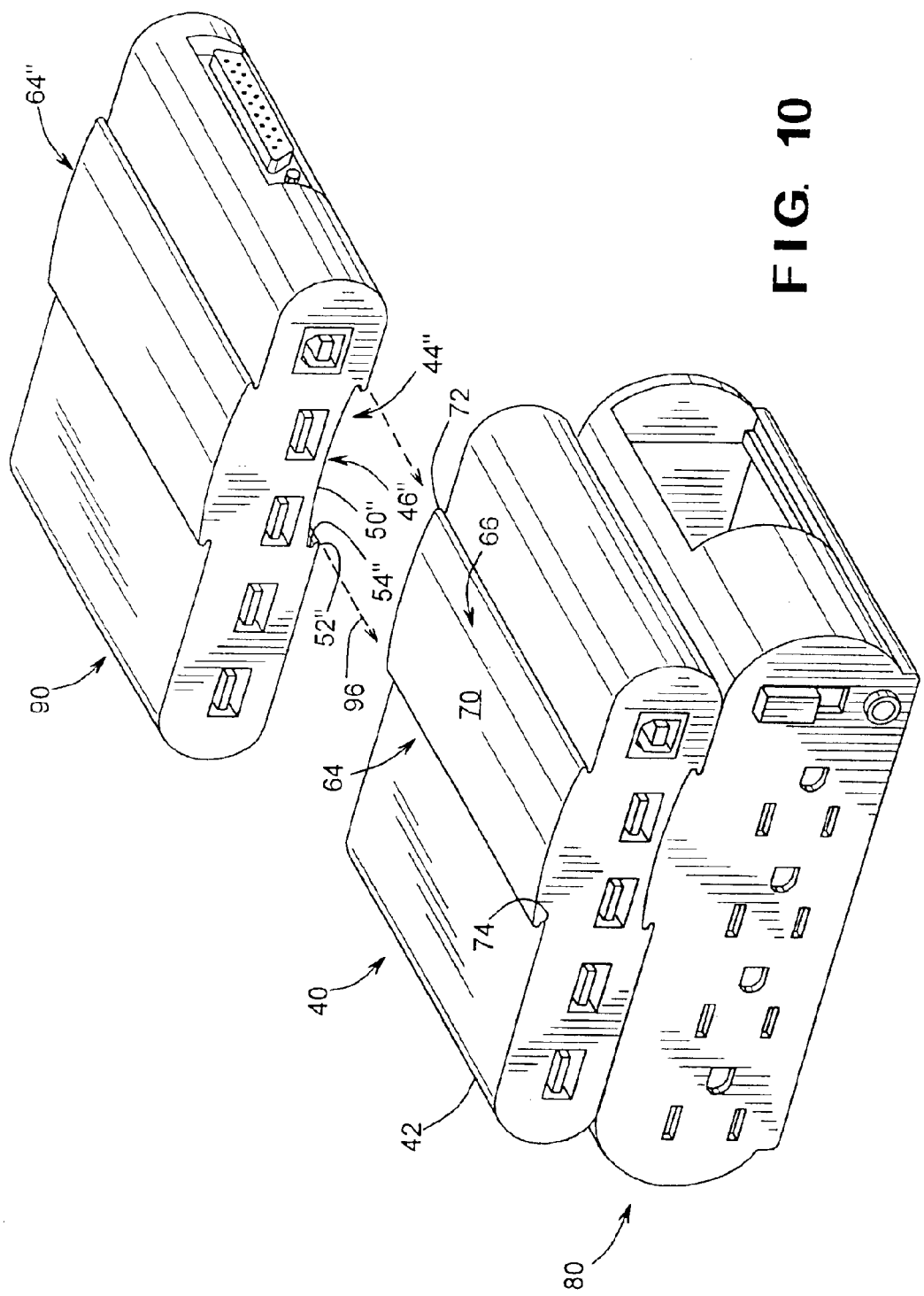
FIG. 10 is a perspective view of the improved USB hub shown in FIG. 2 connecting with an upstream component and a downstream component in accordance with the present invention.

Referring now to FIG. 10, a downstream component 90 may be connected to the USB hub 40 via the downstream power port 64 while the USB hub is connected to the upstream component 80. Examples of the downstream component 90 include but are not limited to another USB hub, a stackable USB to LAN converter (described below), or a stackable USB to SCSI converter.

The downstream component 90 includes at least a downstream power port 64" and preferably also an upstream power port 44", having all of the features of the USB upstream and downstream ports 44, 64 described above. The USB hub downstream power port 64 may be connected to the upstream power port 44" of the downstream component 90 by sliding the second connector 66 of the USB hub into the first connector 46" of the downstream component 90 (as shown by arrows 96 in FIG. 10) so that the boss 70 of the USB second connector 66 is received in the recess 50" of the first connector 46" on the downstream component. The first connector flanges 52" slide into the USB hub second connector grooves 74 and the USB hub second connector flanges 72 slide into the first connector grooves 54" on the downstream component.

The USB hub and the downstream component 90 are connected correctly when the second ends 56b and 58b of the USB hub second connector positive and ground conductors 56, 58 make electrical contact with the corresponding positive and ground conductors 56", 58" in the first connector 46" of the downstream component. When the downstream component 90 is connected to the USB hub in this manner, and the USB hub is connected to the upstream component 80 as described above, the positive voltage and ground for high power applications is passed from the upstream component 80 through the USB hub 40 to the downstream component 90.

Referring now to FIGS. 11–14, a base unit 100, an example of an upstream component 80, is shown. The base unit 100 includes a housing 101. The base unit also includes a power cord 102 for connecting to a conventional AC outlet (not shown) thereby providing power to the base unit. Conventional outlets 104 are disposed on the housing 101 for distributing AC power to other electrical components connected to the outlets in a known manner. The base unit 100 also includes an optional on/off switch 106 and a circuit breaker which are conventional and known in the art.

The base unit 100 also includes bays 110 disposed in the housing 101 for receiving one or more surge suppressor modules 112. The surge suppressor modules 112 include conventional surge suppression circuitry (shown in phantom at 113 in FIG. 14) which is known in the art for providing surge suppression to any conventional electrical components 114 connected to the modules via connectors 116. The connectors 116 may be conventional co-axial connectors, RJ11 connectors for connecting telephone lines for modems, RJ45 connectors or any other suitable connectors. A ground conductor 117a is provided in the bay 110 for connection to a ground conductor 117b disposed on the surge suppressor module 112 for providing ground to the surge suppression circuitry 113 when the module is received in the bay. The ground conductors 117a, 117b have complementary shape so as to connect together in any known manner.

The base unit 100 may optionally provide surge suppression to electrical components connected to the outlets 104 via conventional surge suppression circuitry contained within the USB circuitry 43a described above. Alternatively, a separate removable surge suppression module 112 housed within one of the bays 110 may provide the surge suppression to the electrical components connected to the outlets 104.

The base unit 100 also includes a downstream power port 64' similar to the USB downstream power port 64 described above. Any stackable modular component may be mounted to the base unit 100 via the downstream power port 64' as described above.

An optional conventional power connector 118 may also be disposed on the housing 101. The power connector 118 includes a positive voltage conductor 118a and a ground conductor 118b for providing DC voltage, preferably 5 volts, and ground to the base unit 100 from a conventional source such as a transformer (not shown) connected to a conventional AC power outlet, or from the computer (not shown) as shall be described in further detail below. The voltage and ground conductors 118a, 118b are electrically connected to the positive voltage conductor 56 and the ground conductor 58 described above. The power connector 48 may be any conventional power connector known in the art.

Referring now to FIGS. 15–17, an alternate embodiment of the stackable USB hub 40 described above is shown generally at 120. The alternate embodiment is a seven port USB hub 120 having seven downstream USB ports 24 with seven USB connectors 26 for connecting seven peripheral devices (shown at 28 in FIG. 1) to the USB hub 120. The seven port USB hub 120 is similar to the four port USB hub 40 described above, and includes a similar upstream power port 44 and downstream power port 64.

Referring now to FIGS. 18–20, a second alternate embodiment of the stackable USB hub 40 described above is shown generally at 130. The second embodiment is a stackable four port USB hub 130 including all of the features of the stackable four port USB hub 40 described above. In addition, the USB hub 130 includes conventional USB to parallel converter circuitry (shown in phantom at 132) and a parallel connector 134 which are known in the art. The USB hub 130 further includes conventional USB to serial converter circuitry (shown in phantom at 136) and a serial connector 138 which are also known in the art.

Referring now to FIGS. 21–23, a stackable USB to SCSI converter is shown general at 140. The stackable USB to SCSI converter 140 includes the upstream power port 44 and the downstream power port 64 described above. The stackable USB to SCSI converter 140 further includes a conventional USB upstream port 20 (refer to port 20 shown in FIG. 1) and connector 22, a DB25 or HP DB50 Port and connector 142, and conventional circuitry (shown in phantom at 144) which is known in the art for converting data between USB format and SCSI format. The stackable USB to SCSI converter 140 is mountable to any stackable component described herein via the upstream and/or downstream ports 64, 44. The stackable USB to SCSI converter 140 receives the positive voltage and ground through the upstream power port 44 for powering the converter 140 and associated circuitry 144. Furthermore, the stackable USB to SCSI converter 140 passes the positive voltage and ground to other stackable components mounted to the downstream power port 64 as described above.

Referring now to FIGS. 24–26, a stackable USB to LAN converter is shown general at 150. The stackable USB to LAN converter 150 includes the upstream power port 44 and the downstream power port 64 described above. The stackable USB to LAN converter 150 further includes a conventional USB upstream port 20 (refer to port 20 shown in FIG. 1) and connector 22, a LAN cable connector 152, and conventional circuitry (shown in phantom at 154) which is known in the art for converting data between USB format and LAN format. The stackable USB to LAN converter 150 is mountable to any stackable component described herein via the upstream and/or downstream ports 64, 44. The stackable USB to LAN converter 150 receives the positive voltage and ground through the upstream power port 44 for powering the converter 150 and associated circuitry 154. Furthermore, the stackable USB to LAN converter 150 passes the positive voltage and ground to other stackable components mounted to the downstream power port 64 as described above.

Figure 27:
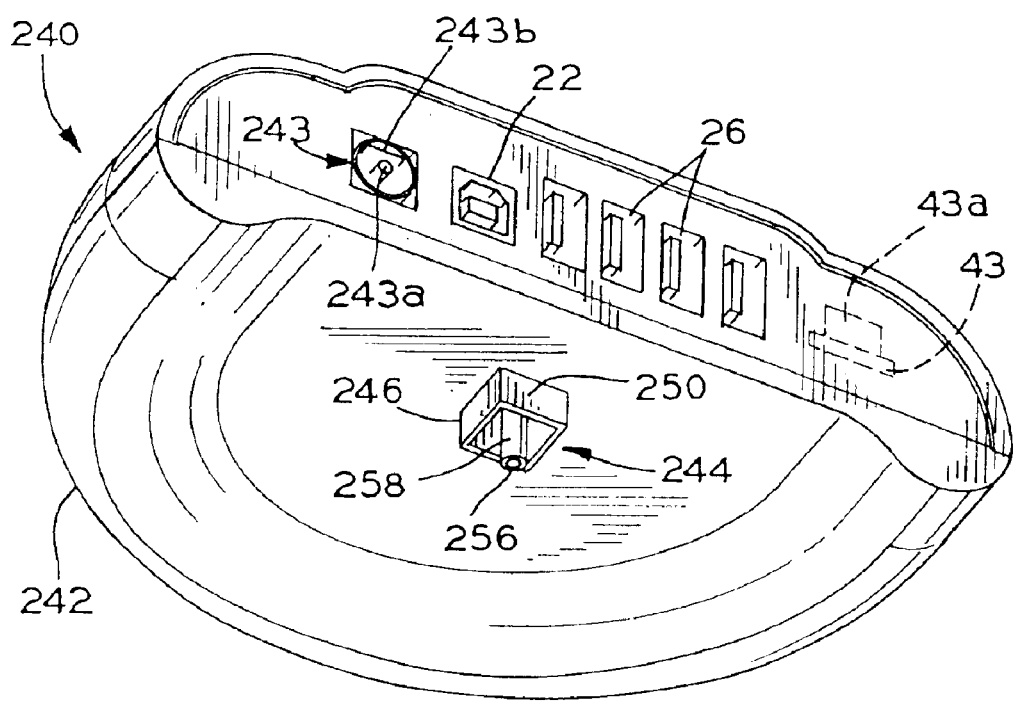
FIG. 27 a perspective view illustrating the back and bottom of a third alternate embodiment of the stackable USB hub in accordance with the invention.
Figure 28:
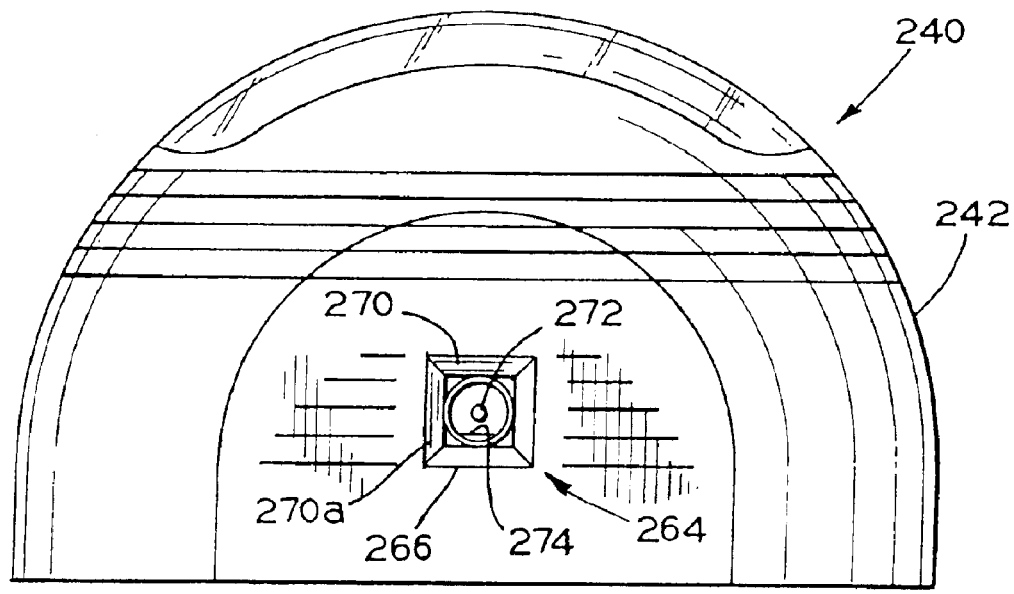
FIG. 28 is a top plan view of the stackable USB hub shown in FIG. 27.
Figure 29:
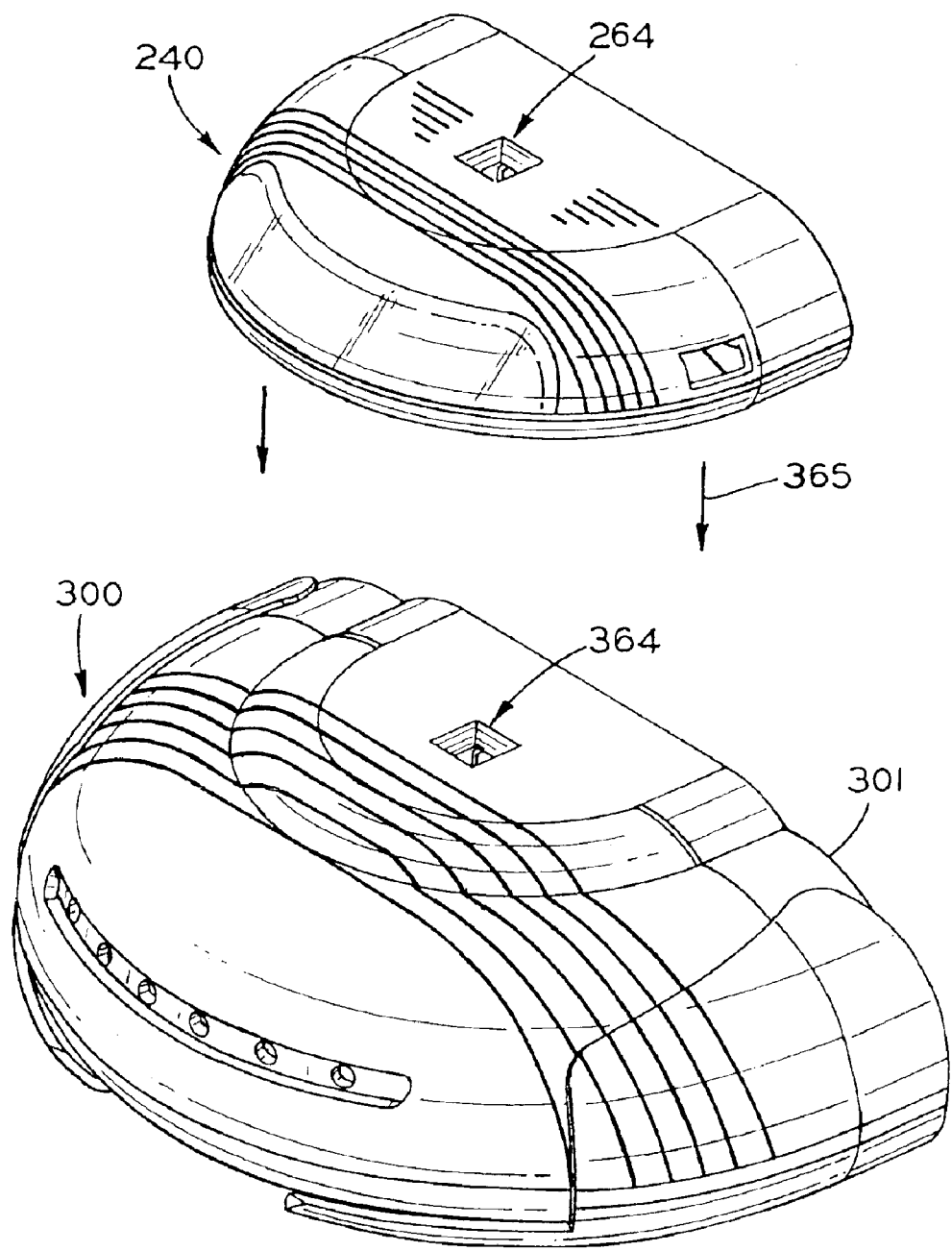
FIG. 29 is a perspective view illustrating an alternate embodiment of the base unit in accordance with the invention and the stackable USB hub shown in FIGS. 27 & 28.

Referring now to FIGS. 27–28, a third alternate embodiment of the stackable USB hub 40 described above is shown generally at 240. The components of the USB hub 240, which are similar to the conventional USB hub shown in FIG. 1, are indicated with the same numerals. The stackable USB hub 240 includes a USB type B female connector 22 connected to an upstream port 20 (refer to port 20 shown in FIG. 1) and plurality of downstream USB ports 24, preferably between 4 and 7 such USB ports. Each port 24 includes a USB type A female connector 26 for connecting peripheral devices 28 as described above to the USB hub 240.

The stackable USB hub 240 also includes a housing 242 containing the circuit board (a portion of which is shown in phantom at 43 and is similar to circuit board 43 described above) within the housing. The circuit board 43 includes conventional USB hub circuitry 43a shown above. The USB type A and B connectors 22, 26 are preferably disposed in the back of the housing 242 although any suitable location may be used.

An optional conventional power connector 243 is also disposed at the back of the housing 242. The power connector 243 includes a positive voltage conductor 243a and a ground conductor 243b for providing DC voltage, preferably 5 volts, and ground to the hub 240 from a conventional source such as a transformer (not shown) connected to a conventional AC power outlet, or from the computer (not shown) as shall be described in further detail below. The voltage and ground conductors 243a, 243b are electrically connected to the circuit board 43 and the USB circuitry 43a in a conventional manner so as to provide power to the USB hub 240 for high power applications.

The USB hub housing 242 includes an upstream power port 244 preferably disposed on the bottom of the housing for mounting the stackable USB hub 240 to a stackable upstream component 80 as described above and for receiving voltage and ground from the upstream component for high power hub applications. Furthermore, the USB hub housing 242 includes a downstream power port 264 preferably disposed on the top of the housing for mounting a stackable downstream component 90 to the USB hub 240 and for passing the voltage and ground received from the upstream power port 244 or from the power connector 243 to the downstream component thereby supplying its power demands.

The upstream power port 244 includes a first connector 246 for mating with a complementary shaped second connector on the downstream power port of the upstream component 80. Examples of the upstream component 80 include but are not limited to a base unit (described below), another USB hub, a stackable USB to LAN converter, or a stackable USB to SCSI converter having a suitable downstream power port 264 as described below. The first connector 246 is preferably a male connector and includes a boss 250 extending from the housing 242. The boss 250 is preferably square, although alternatively it may be rectangular or any other suitable shape.

The upstream power port 244 also includes a positive voltage conductor 256 and ground conductor 258 which extend from the housing, preferably extending beyond the boss 250. The positive conductor 256 and ground conductor 258 preferably form the radially inner and radially outer sides respectively of a conventional cylindrical male DC power connector, although alternatively, the conductors may be reversed, or may form any suitably shaped connector. The voltage and ground conductors 256, 258 are electrically connected to the circuit board 43 and with the USB circuitry 43a in a conventional manner so as to provide power to the USB hub 240 for high power applications described above. Furthermore, the positive voltage conductor 256 and ground conductor 258 also are electrically connected to the positive voltage conductor 243a and ground conductor 243b of the optional power connector 243 disposed at the back of the stackable USB hub 240.

The downstream power port 264 includes a second connector 266 having a shape which is complementary to the first connector so that the second connector will mate with the first connector of the upstream power port of the downstream component 90. The first connector 266 is preferably a female connector and includes a recess 270 extending into the housing 242, preferably at the top of the housing. The recess 270 is shaped to receive the boss 250 described above, accordingly the recess is preferably square, although alternatively it may be rectangular or any other suitable shape which is complementary to the boss. The recess 270 may include an optional bevel 270a to guide the boss 250 within the recess.

The downstream power port 264 also includes a positive voltage conductor 272 and ground conductor 274 which preferably extend beyond the boss 250. The positive conductor 272 is shaped to be received within the conventional cylindrical male DC power connector of the first connector 246 in the upstream stream power port 244.

The voltage and ground conductors 272, 274 are electrically connected to the voltage and ground conductors 256, 258 of the first connector 246. Accordingly, voltage and ground are passed from the upstream power port 244 to the downstream power port 264 of the stackable USB hub 240, and to the upstream power port of another stackable component 90 connected to the stackable hub 240. Additionally, the voltage and ground conductors 272, 274 are electrically connected to the circuit board 43, USB circuitry 43a and to the optional power connector 243 disposed at the back of the stackable USB hub 240.

Referring now to FIGS. 29–32, the stackable USB hub 240 is shown connecting with another example of an upstream component 80, an alternate embodiment of the base unit 100 shown generally at 300, The base unit 300 includes a housing 301, and a power cord 302 for electrically connecting the base unit 300 to a conventional AC outlet (not shown) thereby providing power to the base unit. The base unit also includes conventional outlets 304 for distributing AC power to other electrical components connected to the outlets in a known manner. The base unit 300 also includes an optional on/off switch and circuit breaker 306, although alternatively the circuit breaker may be physically separate from the on/off switch as is known in the art.

The base unit 300 also includes bays 310 for receiving one or more surge suppressor modules 312. The surge suppressor modules 312 include conventional surge suppression circuitry 313, similar to the circuitry 113 described above, which is known in the art for providing surge suppression to any conventional electrical components connected to the modules via connectors 316. The connectors 316 may be conventional co-axial connectors, RJ11 connectors for connecting telephone lines for modems, RJ45 connectors or any other suitable known connectors. A ground conductor 317a (shown in phantom in FIG. 30a) is provided in the bay 310 for connection to a ground conductor 317b (also shown in phantom in FIG. 30a) disposed on the surge suppressor module 312 for providing ground to the surge suppression circuitry 313 when the module is received in the bay in a similar manner as described above. The ground conductors 317a, 317b have complementary shape so as to connect together in any known manner.

The base unit 300 may optionally provide surge suppression to electrical components connected to the outlets 304 via conventional surge suppression circuitry which is known in the art. Alternatively, a separate removable surge suppression module 320 housed within one of the bays 310 (shown in the bottom of the base unit in FIG. 32) includes conventional surge suppression circuitry (shown in phantom at 321) which is known in the art for providing surge suppression to the electrical components connected to the outlets 304. A cover 314 is provided to selectively close the bay 310. The surge suppression module 320 also includes a ground conductor (not shown) provided in the bay 310 for connection to a ground conductor (also not shown) disposed on the surge suppressor module 320 for providing ground to the surge suppression circuitry 321 when the module is received in the bay in a similar manner as described above. The ground conductors have complementary shape so as to connect together in any known manner.

Figure 30:
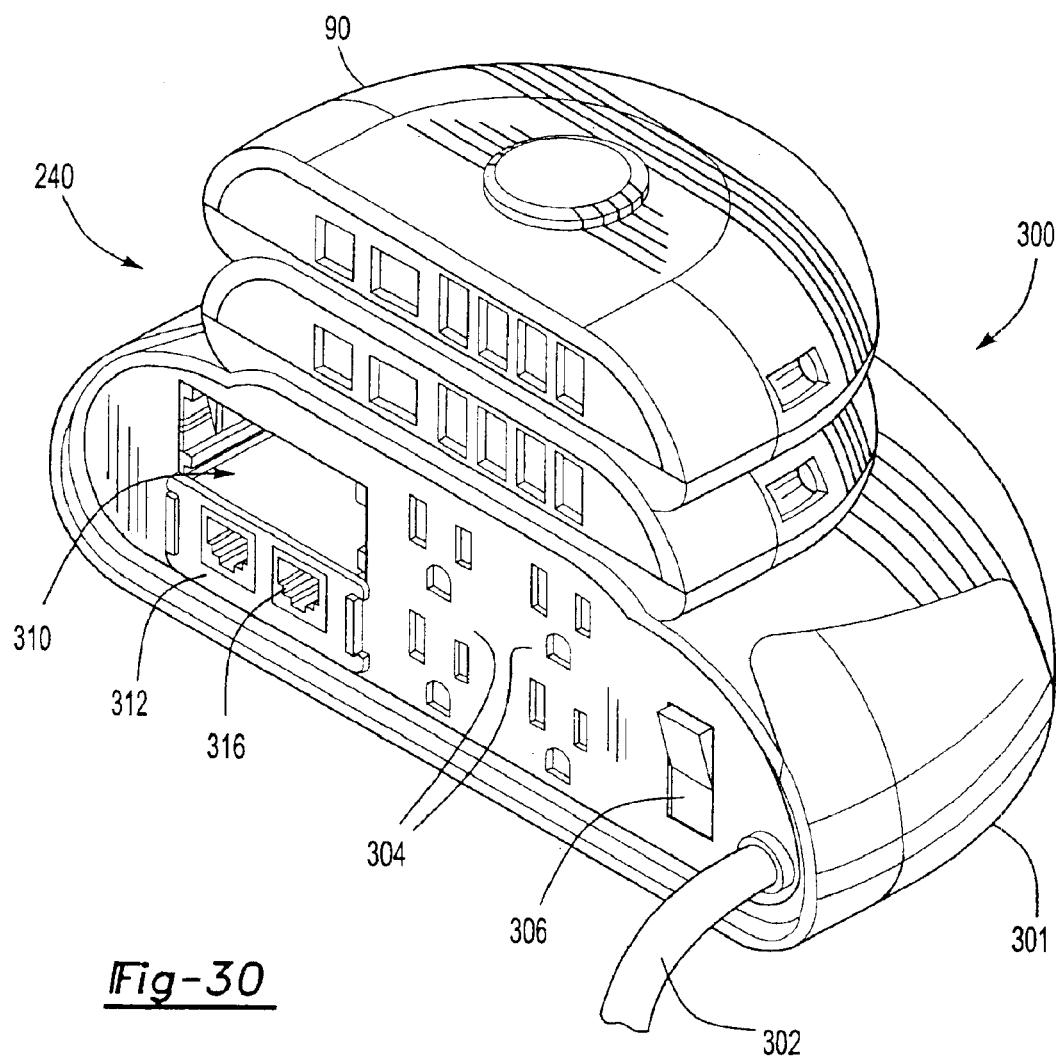
FIG. 30 is a perspective view illustrating the stackable USB hub shown in FIGS. 27 & 28 connected to a similar stackable USB hub and the base unit shown in FIG. 29 in accordance with the invention.
Figure 30A:
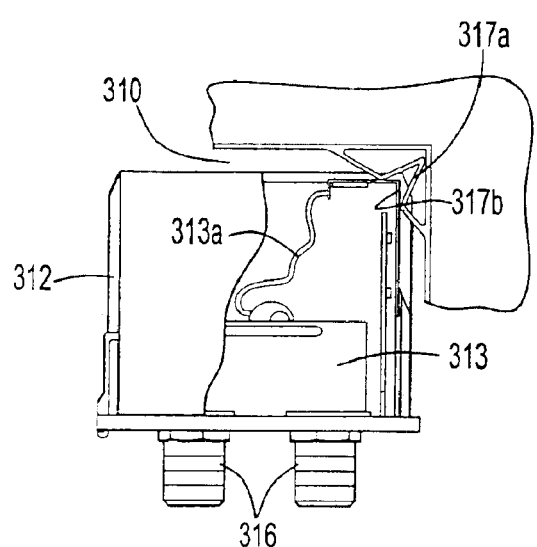
FIG. 30a is an enlarged view of the surge suppressor module shown in FIG. 30.
Figure 31:
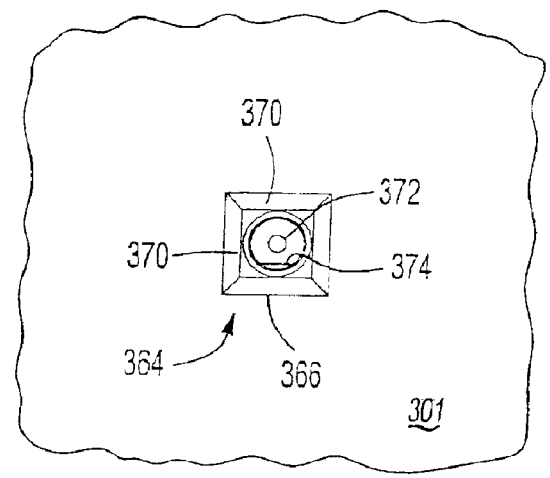
FIG. 31 is an enlarged view of the base unit shown in FIGS. 29 & 30 illustrating the power port in accordance with the invention.
Figure 32:
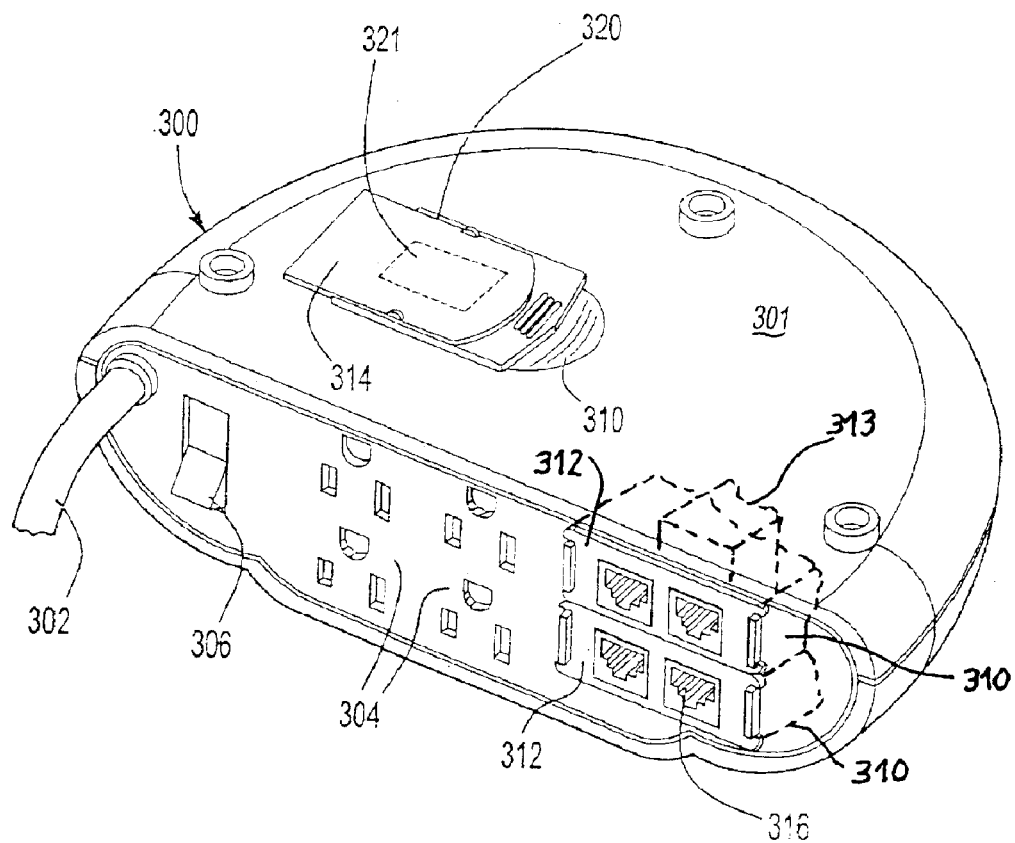
FIG. 32 is a perspective view illustrating the back and bottom of the base unit shown in FIGS. 29 & 30.
Figures 33, 34:
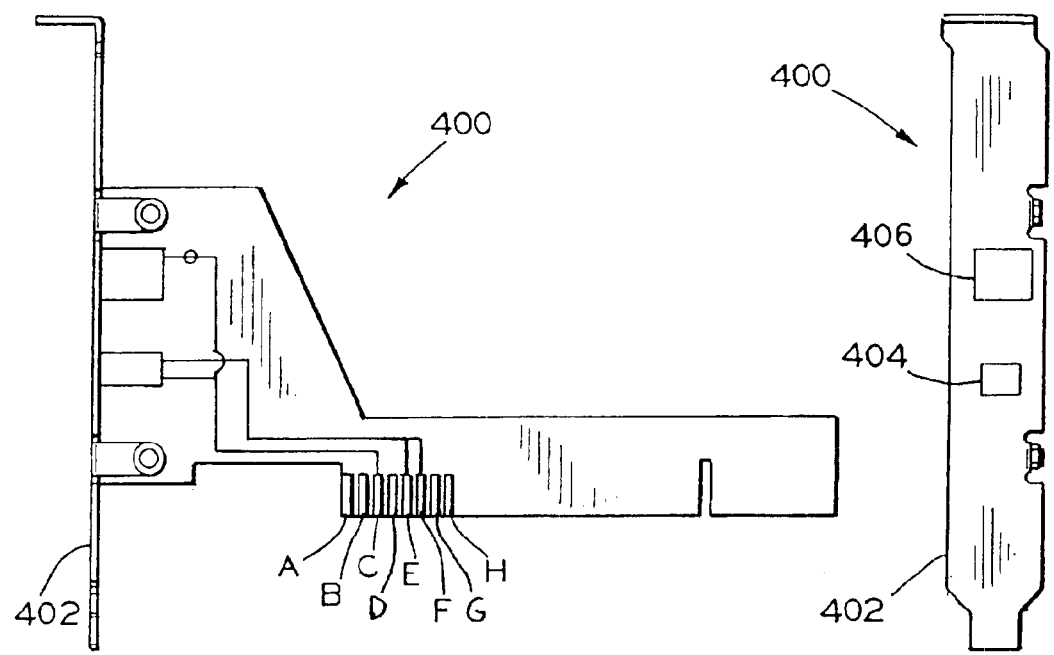
FIG. 33 is a side view illustrating the PCI card in accordance with the invention.
FIG. 34 is a front view of the PCI card shown in FIG. 33.
Figures 35, 36:
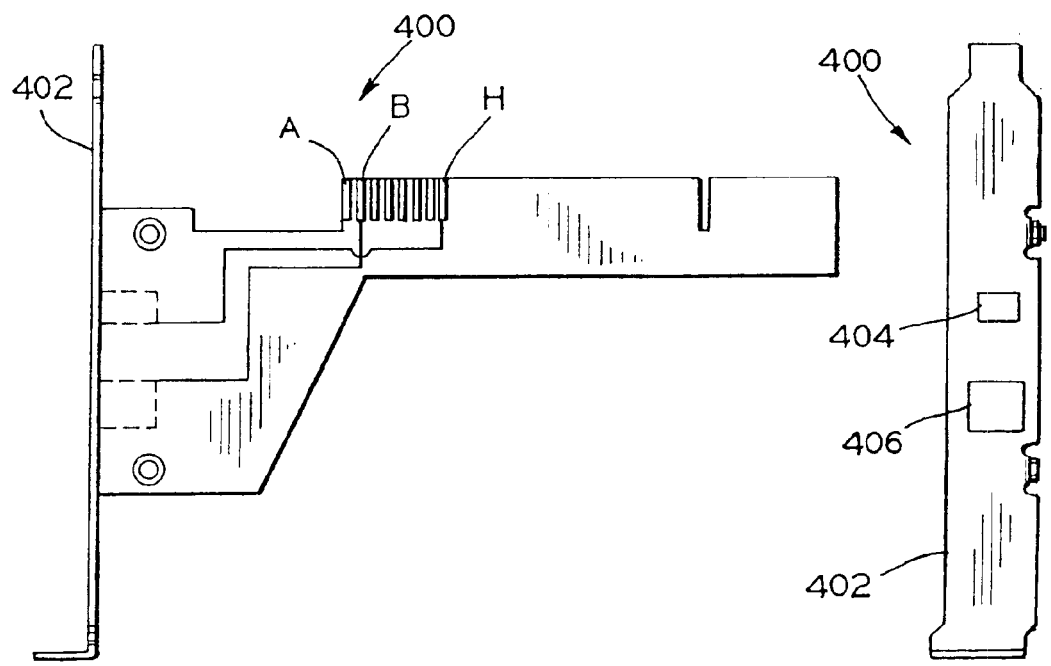
FIG. 35 is a side view illustrating the PCI card shown in FIG. 33.
FIG. 36 is a front view illustrating the PCI card shown in FIG. 35.

The base unit 300 also includes a downstream power port 364 having a second connector 366, a recess 370 and conductors 372 and 374 (as shown in FIG. 31) which are all similar to the downstream power port 264 on the stackable USB hub 240 as described above. The stackable USB hub 240 is mounted directly to the base unit 300 by placing the hub on top of the base unit along an axis of stacking (as shown by arrows 365 in FIG. 29) so that the first connector 246 of the hub upstream power port 244 is connected to the second connector 366 of the base unit downstream power port 364. Any suitable stackable modular component may be mounted to the base unit 300 via the downstream power port 364 as described above. As shown in FIG. 30, the housing of each component which may be used as an upstream component includes a raised portion, and the housing of each component which may be used as a downstream component includes a complementary shaped recessed portion for receiving the raised portion of the upstream component thereby improving the fit between the components when mounted together. An optional conventional power connector similar to the connector 118 described above may also be disposed on the housing 301.

Referring now to FIGS. 33–36, a PCI card is shown generally at 400. The PCI card 400 includes 8 pads or pins labeled A–H which fit into the PCI slot of a conventional computer (not shown). The PCI card 400 also includes a face plate 402 which is accessible to the computer user, typically from the back of the computer, when the card is installed in the computer. The PCI card 400 includes a 5 volt DC connector 404 disposed on the face plate which includes a 5 volt conductor and a ground conductor. The 5 volt conductor is electrically connected to pins E, F and H which receive 5 volts when the card 400 is plugged into the PCI slot. The ground conductor is electrically connected to pin C which receives a ground connection when the card 400 is plugged into the PCI slot. The 5 volt DC connector 404 can be any suitable conventional connector known in the art, but preferably is suitable for connection to the stackable hub power connector 243 described above for providing power to the hub for high power applications.

The PCI card 400 also includes a 12 volt DC connector 406 which is also disposed on the face plate 402. The 12 volt DC connector 404 includes a 12 volt conductor connected to pin B which receive 12 volts when the card 400 is plugged into the PCI slot. The 12 volt DC connector 404 also includes a ground conductor connected to pin C which receives ground when the card 400 is plugged into the PCI slot. The 12 volt DC connector 406 can be any suitable conventional connector known in the art, but preferably is suitable for connection to any suitable electronic component by 1394 firewire connection for providing 12 volt DC power to the component.

Figure 37:
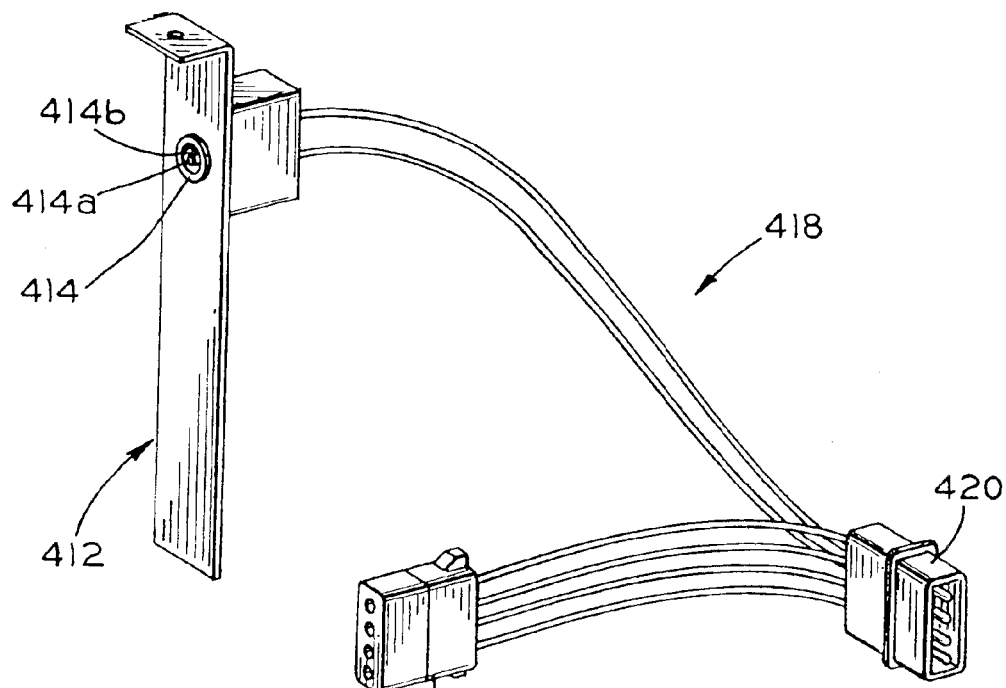
FIG. 37 is a perspective view of an alternate embodiment of the face plate with voltage connector shown in FIG. 34 in accordance with the invention.
Figure 38:
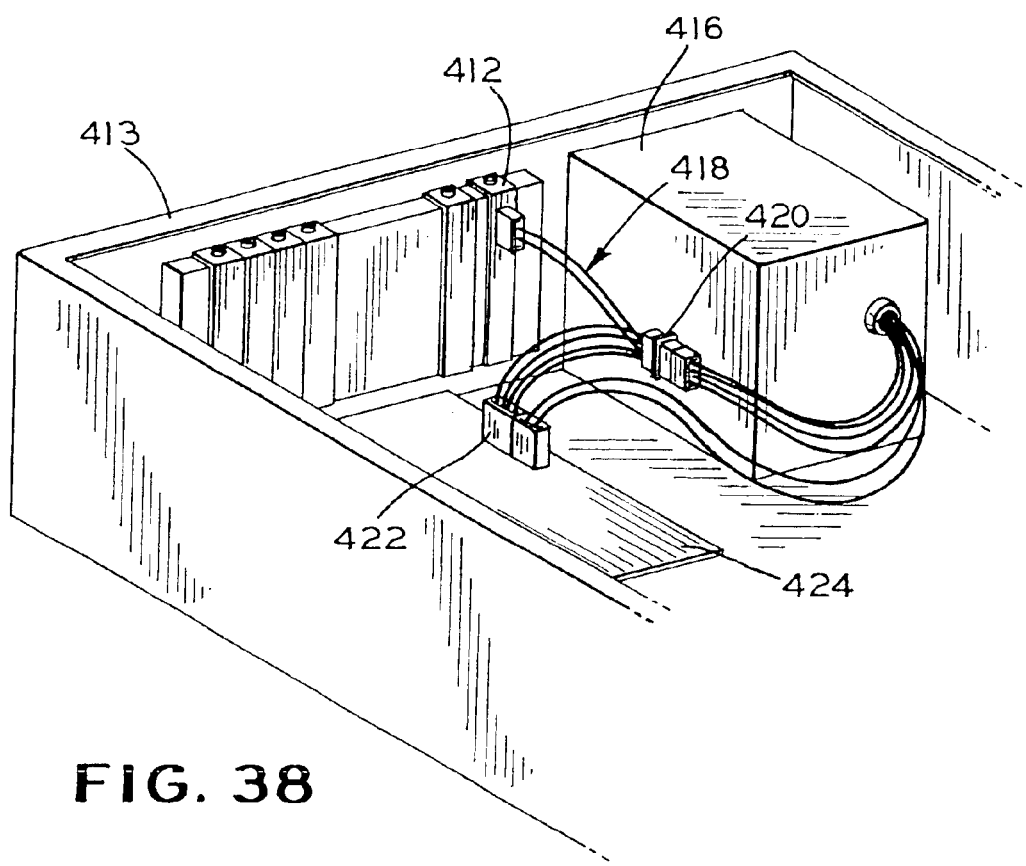
FIG. 38 is a perspective view of the face place with voltage connector shown in FIG. 37 connected to a computer in accordance with the invention.

Referring now to FIGS. 37 & 38, an alternative embodiment of the face plate 402 is shown generally at 412. The face plate 412 is accessible to the computer user, typically from the back of the computer 413 when installed. The face plate 412 includes a known DC voltage connector 414 disposed on the face plate for providing voltage, preferably 5 volts, and ground to any of the hubs or base units described herein. The connector 414 includes a voltage conductor 414a and a ground conductor 414b. The voltage conductor 414a and ground conductor 414b are electrically connected to the power supply 416 via a Y-connector 418. The Y-connector includes suitable known connectors 420 and 422 for connecting between the power supply 416 and any suitable PC board 422 within the computer 424. The Y-connector is also connected to the conductors 414a & 414B for supplying voltage and ground to the conductors 414a, 414b from the computer 413.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A base unit releasably mountable to a housing of a stackable component, said base unit comprising:

a housing;

at least one conventional outlet disposed on said housing for distributing AC power to an electrical component connected thereto;

a downstream power port disposed on a top of said housing for removably mounting said base unit to a downstream stackable component and for providing voltage and ground to the downstream stackable component; and a downstream power port connector included in said downstream power port and having a boss protruding from said housing and a pair of flanges, each of said flanges extending from an opposite side of said boss, and a groove formed between each of said flanges and said top of said housing.

2. The base unit according to claim 1 wherein said downstream power port includes a voltage conductor and a ground conductor for passing voltage and ground to the downstream component connected to said downstream power port.

3. A base unit releasably mountable to a housing of a stackable component, comprising:

a housing having a top for supporting a downstream stackable component;

at least one conventional outlet disposed on said housing for distributing AC power to an electrical component connected thereto;

a downstream power port disposed on said top of said housing for removably mounting the downstream stackable component on said top of said housing and for providing an electrical voltage and a ground potential to the downstream stackable component; and a downstream female power port connector included in said downstream power port and having a recess extending into said top of said housing, said recess being shaped to receive an upstream male power port connector disposed on a housing of the downstream stackable component.

4. The base unit according to claim 3 wherein said recess includes a bevel formed in said housing for guiding the upstream male power port connector into said recess.

5. The base unit according to claim 3 wherein said downstream female power port connector includes a pin conductor for providing the electrical voltage and a tubular conductor for providing the ground potential, said pin conductor being encircled by said tubular conductor.

* * * * *